Patented June 18, 1929.

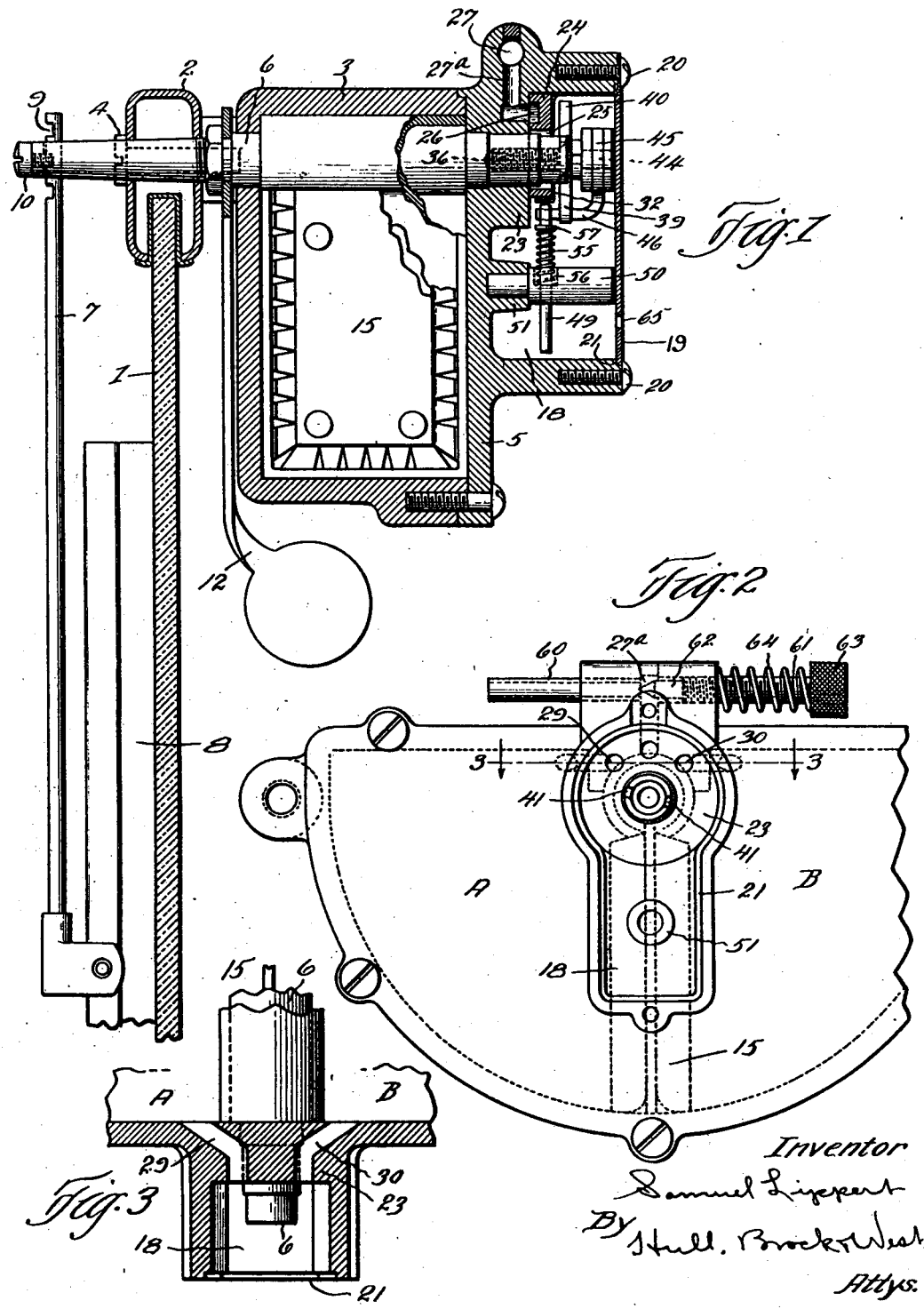

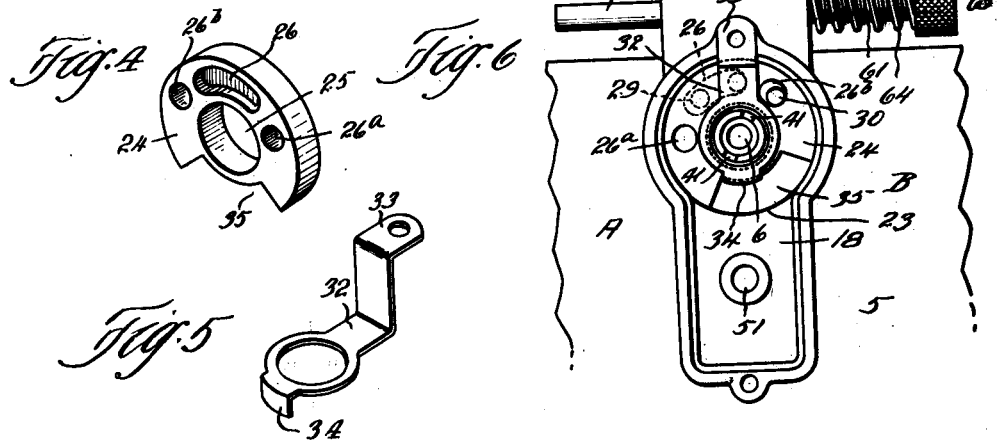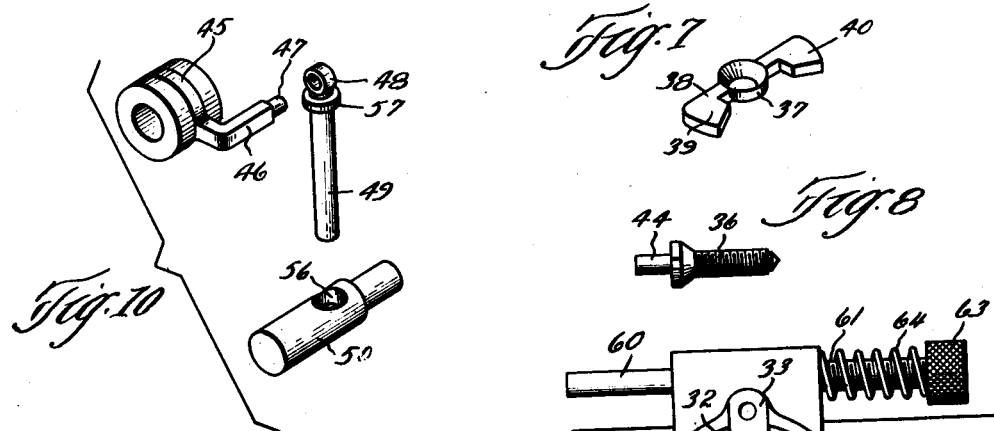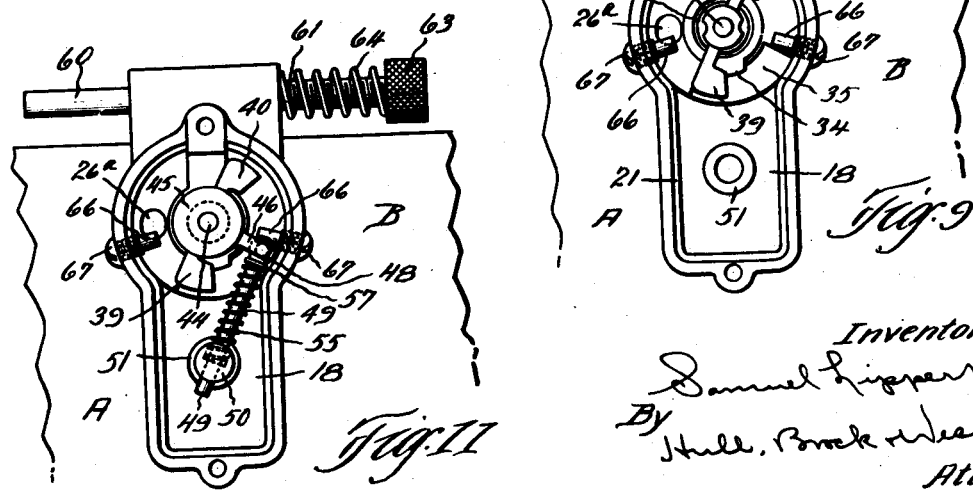

1,717,700

UNITED STATES PATENT OFFICE.

SAMUEL LIPPERT, OF GARFIELD HEIGHTS, OHIO, ASSIGNOR TO THE OUTLOOK MANUFACTURING COMPANY, OF CLEVELAND, OHIO, A CORPORATION OF OHIO.

VALVE MECHANISM.

Application filed May 31, 1924, Serial No. 716,959. Renewed November 5, 1928.

This invention relates to pressure fluid motors, and more particularly to improvements in the valve mechanism of such motors.

My present improvements are contrived especially for use in the type of motors shown in my co-pending application Serial No. 638,835, filed May 14, 1923; and the general objects which I have in view are to render the valve mechanism more certain and reliable of operation and more uniform and speedy of action than has heretofore been the case in motors of the type referred to; to relieve the valve of the shock incident to the operation in my former construction; and to design the valve so that it is much easier to make it fluid tight, requiring less skill and accuracy in accomplishing this end and so that it will improve in this regard with continued use.

The foregoing objects, with others hereinafter appearing, are attained in the construction illustrated in the accompanying drawings wherein Fig. 1 is a central vertical section through a pressure fluid motor embodying the invention and which is shown incorporated in windshield cleaning apparatus and attached to a windshield frame; Fig. 2 is a fragmentary rear elevation of the motor with the cover plate of the valve housing removed and the valve mechanism omitted; Fig. 3 is a horizontal section on the line 3—3 of Fig. 2; Fig. 4 is a perspective view of the valve; Fig. 5 is a similar view of the valve retaining member; Fig. 6 is a fragmentary rear elevation of the motor showing the valve and its retaining member in place within the valve housing; Fig. 7 is a perspective view of a trip included in the valve mechanism; Fig. 8 is an elevational view of the screw on which the trip is journaled; Fig. 9 is a view similar to Fig. 6 showing the trip and screw of Figs. 7 and 8 added to the assembly of Fig. 6; Fig. 10 is a perspective view including the valve tappet, spring guide pin and the rocking abutment; and Fig. 11 shows the parts of Fig. 10 added to the mechanism as it is illustrated in Fig. 9.

The type of motor to which my present invention relates, being especially suitable for use with windshield cleaning apparatus, is illustrated in such connection herein.

In Fig. 1 the pane of a windshield is represented at 1 and it is equipped with the usual frame 2 to which the casing 3 of the motor is connected by screws 4.

The motor casing and parts enclosed thereby may be identical with the corresponding elements of the motor disclosed in my application above identified, the rear side of the casing being constituted of a wall 5. This and the front wall of the casing have aligned bearing apertures within which the motor shaft 6 is journaled. The shaft projects from the front of the casing through a hole in the windshield frame 2 and at its forward end has connected to it a wiper carrying arm 7 which supports a wiper 8 in cleaning contact with the outer surface of the windshield pane 1. The connection between the shaft 6 and arm 7 is made adjustable by providing a series of notches 9 in the arm 7 into any one of which a set screw 10, that is threaded axially through the end of the shaft, is adapted to be engaged. An operating arm 12 may be secured to the shaft 6 between the casing 3 and the inner side of the windshield so that the wiper may be manually operated when desired.

A piston 15, like that described and claimed in my aforesaid application, is secured to the shaft 6 and divides the casing into two compartments designated A and B in Fig. 2 where the interior of the casing and the piston 15 are indicated by dotted lines.

Shown as formed integral with the wall 5 is a housing 18 which contains the valve mechanism and the rear side of which is adapted to be closed by a removable closure 19 that is held in place by screws 20, the inner edge portion of the wall of the housing being rabbeted, as indicated at 21, to provide a depressed seat for the edge of the closure 19.

The upper portion of the housing 18 is made cylindrical and is concentric with the axis of the shaft 6 and is thickened as shown at 23, the rear face of the thickened portion being smooth and flat to form a proper seat for a valve 24. The valve is in the nature of a disk having a central opening 25 which is somewhat greater in diameter than, and accommodates the rear end of, the shaft 6 where the shaft protrudes beyond the valve seat. Formed in the front face of the valve is an arcuate groove 26, and spaced from the ends of the groove are ports 26ª and 26ᵇ. Extending through a transverse boss that is situated at the upper end of the housing 18 is a passageway 27 having an angular branch 27ª that opens through the valve seat and is in constant communication with the arcuate groove 26 of the valve.

From points on opposite sides of the branch pasageway 27ª, and spaced a like distance therewith from the axis of the shaft 6, are passageways 29 and 30 which lead, respectively, to compartments A and B of the motor casing.

The valve 24 is retained against its seat by a resilient member 32, shown in perspective in Fig. 5, the member having one of its ends, designated 33, clamped in place against the top wall of the housing 18 by one of the screws 20 which holds the closure 19 in place, the member being formed to surround the shaft 6 and terminate therebeyond in a tongue 34 which occupies a notch 35 of the valve 24, the ends of the notch being substantially radial and constituting circumferentially spaced abutments. These abutments cooperate with the tongue 34 to stop the valve at the ends of its movement in opposite directions. The valve and its retaining member are shown in place within the housing 18 in Fig. 6.

The rear end of the shaft 6 is tapped to receive a screw 36, and is counterbored to receive the hub portion 37 of a trip 38 which has opposed arms 39 and 40. The hub portion 37 of the trip has a tapered-wall aperture within which the conical head of the screw 36 fits, the trip being secured against rotation with respect to the shaft 6 by reason of its arm fitting within notches 41 of the shaft. A stud 44 projects rearwardly from the head of the screw 36 to within a slight distance of the closure 19, and the hub of a tappet 45 is journaled upon said stud, the closure serving to retain the tappet in place. The tappet includes an angular arm 46 that extends inwardly past the plane of the trip 38 and into the notch 35 of the valve where it terminates in a cylindrical portion 47 on which is journaled the eye 48 of a spring guide pin 49 that has its lower end slidably engaged through a hole in an abutment 50. This abutment is reduced at its forward end for bearing in the bore of a tubular boss 51 that extends rearwardly from the wall 5 and the abutment is held against displacement by the closure 19. The abutment, thus mounted, is capable of rocking on its longitudinal axis. A compression spring 55 surrounds the pin 49 and is confined between the bottom wall of a counterbore 56 of the abutment 50 and a collar 57 on the pin 49. The eye 48 of the pin 49 is adapted to engage the opposed abutments formed by the end walls of the notch 35 of the valve.

Within one end of the previously mentioned passageway 27 is fitted a tubular connection 60, and the threaded stem 61 of a needle point valve 62 is screwed into the opposite end of the passageway, the valve serving to govern the flow of fluid through the branch passageway 27ª. The valve 62 has a suitable operating head 63, and a spring 64, that surrounds the stem of the valve and is compressed between the head 63 and an opposed part of the housing 18, serving to exert enough pressure on the threads of the valve stem to prevent accidental displacement of the valve through vibration.

In its present environment, the motor operates as a suction motor, the connection 60 having communication through a suitable conduit (not shown) with the intake manifold of the internal combustion engine whereby the vehicle on which the windshield is mounted is propelled.

Considering the valve in the position illustrated, communication is established between the passageway 27 and the compartment A through the branch 27ª, groove 26 and passageway 29. The compartment A is therefore being exhausted and the piston 15 is moving toward the left (as the parts are viewed in Fig. 2) while in the meantime air is being admitted to the compartment B through the port 26ᵇ of the valve and the passageway 30. It may be explained that the ports 26ª and 26ᵇ open into the housing 18 and the housing is supplied with atmospheric air through an aperture 65 in the closure 19. As the piston 15 is moved to the left, the trip 38 is moved in a clockwise direction (see Figs. 9 and 11) and its arm 40, engaging the arm 46 of the tappet 45, swings the tappet in a corresponding direction until the arm 46 passes "dead center", defined by a straight line between the axes of the shaft and the rocking abutment 50. As soon as the arm 46 passes "dead center", the spring 55 impels the arm to the left, throwing the eye 48 against the adjacent end wall of the notch 35 of the valve and moving the valve to its other position, the pin 49 coming to rest with its upper end against one of the stops 66 which are formed by the inner ends of screws 67 that are threaded through the walls of the housing 18. Preferably the valve body does not arrive at the extreme limit of its movement when the pin 49 engages one of the stops 66 but is permitted to travel a slight distance further by momentum until it is stopped by the tongue 34 of the retaining member 32. Upon the valve being tripped as described the compartment B is thrown into communication with the source of suction, while compartment A is thrown into communication with the atmosphere. Consequently the direction of movement of piston 15 is reversed and it now travels to the right until the valve mechanism is again tripped and thus reversed.

By using a compression spring in place of a tension spring as in the construction shown in my above mentioned application, quicker and more uniform action of the valve mechanism is obtained, and this is due to the fact that the compression spring, swinging through an arc below the center of oscillation of the tappet, arrives at a point where it exerts its influence upon the tappet before it travels as far beyond "dead center" as a tension spring is required to travel, swinging, as the latter does, on an arc above the center of oscillation of the tappet. This would clearly appear from a comparison of my present construction with the one shown in my aforesaid application.

Also, by providing movement of the valve slightly in excess of the movement of the valve actuating tappet, the valve is relieved of the shock which would otherwise be imposed upon it.

Having thus described my invention, what I claim is:—

1. In a motor of the class described, the combination of a casing, a piston mounted to oscillate within the casing and having a shaft extending through one of the casing walls, the piston dividing the casing into two compartments, the casing having a main port and two ports leading respectively to the aforesaid compartments, a valve through which the two ports are alternately thrown into communication, one with the main port and the other with the atmosphere, when the valve is moved in opposite directions, a tappet for so moving the valve, said tappet being supported for oscillation upon the axis of the piston shaft, a spring guide pin pivoted to the tappet, means pivotally and slidably supporting the end of the pin remote from the tappet, a compression spring mounted on the pin and confined between an abutment adjacent the tappet and the aforesaid means, and a trip operated by the piston shaft for initiating the movement of the tappet in both directions.

2. In a motor of the class described, the combination of a casing, a piston mounted to oscillate within the casing and having a shaft extending through one of the casing walls, the piston dividing the casing into two compartments, the casing having a main port and two ports leading respectively to the aforesaid compartments, a valve through which the two ports are alternately thrown into communication, one with the main port and the other with the atmosphere, when the valve is moved in opposite directions, a tappet for so moving the valve, said tappet being supported for oscillation upon the axis of the piston shaft, a spring guide pin pivoted to the tappet, a rocking abutment supported by the casing and having an aperture through which the pin is guided at a point remote from its connection with the tappet, a compression spring confined between said abutment and a second abutment adjacent the tappet, and a trip operated by the piston shaft for initiating the movement of the tappet in both directions.

3. In a motor of the class described, the combination of a casing, a piston mounted to oscillate within the casing and having a shaft extending through one of the casing walls, said wall incorporating a valve seat surrounding the piston shaft, the piston dividing the casing into two compartments, the casing having a main port and two lead ports communicating respectively with the aforesaid compartments, said ports opening through the valve seat, a valve engaging said seat and having ports arranged to register with the former ports, the valve serving to alternately throw into communication the two lead ports, one with the main port and the other with the atmosphere, when the valve is moved in opposite directions, the valve having circumferentially spaced abutments, a tappet supported for oscillation on the axis of the shaft and having a part extending between the abutments of the valve, a spring for throwing the tappet to the extreme limit of its movement in opposite directions, stops for limiting the movement of the tappet to something less than the possible movement of the valve, means wherewith the abutments of the valve may engage for limiting the movement of the valve in opposite directions, and a trip operated by the piston shaft for initiating the movement of the tappet in both directions.

4. In a motor of the class described, the combination of a casing, a piston mounted to oscillate within the casing and having a shaft extending through one of the casing walls, said wall having a flat valve seat surrounding the shaft, a piston dividing the casing into two compartments, the casing having a main port and two lead ports which communicate respectively with the aforesaid compartments, said ports opening through the valve seat, a valve surrounding the piston shaft and having a flat face engaging the valve seat, the valve having ports that are arranged to cooperate with the former ports, the valve, when moved in opposite directions, serving to alternately throw into communication the two lead ports, one with the main port and the other with the atmosphere, the valve having a circumferentially extending cut-away portion providing at its ends opposed abutments, a resilient member engaging the valve for maintaining it against its seat, said member having a part extending between said abutments thereby to limit the angular movement of the valve by cooperation with said abutments, a tappet supported for oscillation upon the axis of the piston shaft, a spring for throwing the tappet to the extreme limit of its movement in opposite directions, the tappet having a part disposed between the abutments of the valve, opposed stops for limiting the movement of the tappet to something less than the possible movement of the valve, and a trip operated by the piston shaft for initiating the movement of the tappet in both directions.

5. In a motor of the class described, the combination with a casing, a piston mounted to oscillate within the casing and having a shaft extending through one of the casing walls, said wall incorporating a flat valve seat surrounding the shaft and a housing comprised of walls at substantially right angles to the plane of the valve seat and certain of which are substantially concentric with the shaft, the piston dividing the casing into two compartments, the casing having a main port and two lead ports which communicate respectively with the aforesaid compartments, said ports opening through the valve seat, a disk valve engaging the valve seat and supported for oscillation by the surrounding walls of the housing, the valve having an aperture somewhat larger in diameter than the shaft for accommodating the protruding end of the shaft, the valve having ports arranged to register with the former ports in such manner that when the valve is moved in opposite directions it will serve to alternately throw the two lead ports into communication, one with the main port and the other with the atmosphere, a resilient member engaging the valve to maintain it against its seat, the valve having spaced abutments, said member having a part extending between said abutments thereby to limit the movement of the valve in opposite directions, a trip carried by the piston shaft, a tappet for oscillation upon the axis of the shaft, the tappet having a part extending between the abutments of the valve, a spring for throwing the tappet to the extreme limit of its movement in opposite directions, and opposed stops carried by the walls of the housing for limiting the movement of the tappet in opposite directions to something less than the possible movement of the valve, the trip serving to initiate the movement of the tappet in opposite directions.

6. In a motor of the class described, the combination with a casing, a piston mounted to oscillate within the casing and having a shaft extending through one of the casing walls, said wall incorporating a flat valve seat surrounding the shaft and a housing comprised of walls at substantially right angles to the plane of the valve seat and certain of which are substantially concentric with the shaft, the piston dividing the casing into two compartments, the casing having a main port and two lead ports which communicate respectively with the aforesaid compartments, said ports opening through the valve seat, a disk valve engaging the valve seat and supported for oscillation by the surrounding walls of the housing, the valve having an aperture somewhat larger in diameter than the shaft for accommodating the protruding end of the shaft, the valve having ports arranged to register with the former ports in such manner that when the valve is moved in opposite directions it will serve to alternately throw the two lead ports into communication, one with the main port and the other with the atmosphere, a closure for the housing which is opposed to the valve seat, means for attaching the closure to the housing, a resilient member held in place by the same means and engaging the valve to maintain it against its seat, the valve having a peripheral notch the ends of which provide circumferentially spaced abutments, said member having a part extending between said abutments thereby to limit the movement of the valve in opposite directions, a trip, means securing the trip to the end of the piston shaft, said means involving a stud, a tappet having a hub portion mounted upon said stud, the tappet having an arm that is extended through the plane of the trip for cooperation with the abutments of the valve, a spring for throwing the tappet to the extreme limit of its movement in opposite directions, and opposed stops carried by the walls of the housing for limiting the movement of the tappet to something less than the possible movement of the valve, the trip serving to initiate the movement of the tappet in opposite directions.

7. In a motor of the class described, the combination of a casing, a piston mounted to oscillate within the casing and having a shaft extending through one of the casing walls, the piston dividing the casing into two compartments, the casing having a main port and two ports leading respectively to the aforesaid compartments, a valve mounted for oscillation upon substantially the axis of the piston shaft and through which the two ports are alternately thrown into communication, one with the main port and the other with the atmosphere, when the valve is moved in opposite directions, the valve having opposed abutments that are spaced apart circumferentially of its arc of movement, a trip secured to the shaft and having opposed arms, a tappet supported for oscillation upon the axis of the shaft and having an arm extending through the path of movement of the arms of the trip and reposing between the abutments of the valve, a spring guide pin pivotally connected to the arm of the tappet, an abutment having an aperture through which the end of the pin remote from the tappet is guided, and a spring surrounding the pin and confined between said abutment and a part adjacent the arm of the tappet, the trip serving to initiate the movement of the tappet in both directions.

In testimony whereof, I hereunto affix my signature.

SAMUEL LIPPERT.